United States Patent
Ohm et al.

(10) Patent No.: US 7,552,846 B2
(45) Date of Patent: Jun. 30, 2009

(54) CONTAINER

(75) Inventors: Heinz Josef Ohm, Limburg (DE); Berno Wörsdörfer, Obernbach (DE)

(73) Assignee: Leifheit AG, Nassau/Lahn (DE)

( * ) Notice: Subject to any disclaimer, the term of this patent is extended or adjusted under 35 U.S.C. 154(b) by 129 days.

(21) Appl. No.: 11/061,847

(22) Filed: Feb. 18, 2005

(65) Prior Publication Data
US 2005/0211727 A1    Sep. 29, 2005

(30) Foreign Application Priority Data
Feb. 19, 2004    (DE) .................. 10 2004 008 423

(51) Int. Cl.
B67D 1/16    (2006.01)
(52) U.S. Cl. ............... 222/108; 222/475.1; 222/571
(58) Field of Classification Search ......... 222/108–111, 222/470–475, 475.1, 518, 509, 571; 220/716–719; 215/41, 392, 393
See application file for complete search history.

(56) References Cited

U.S. PATENT DOCUMENTS

| 41,537 | A | * | 2/1864 | Scripture | 222/108 |
|---|---|---|---|---|---|
| 121,545 | A | * | 12/1871 | Prior | 222/108 |
| 148,511 | A | * | 3/1874 | Schoonmaker | 222/108 |
| 164,128 | A |   | 6/1875 | Babbitt | |
| 188,049 | A | * | 3/1877 | Harrison | 222/108 |
| 198,808 | A | * | 1/1878 | Newbaker | 222/108 |
| 272,525 | A | * | 2/1883 | Deverall | 416/133 |
| 280,048 | A | * | 6/1883 | Laumster | 222/108 |
| 321,074 | A | * | 6/1885 | Ahlum | 222/108 |
| 544,756 | A | * | 8/1895 | Vogel | 222/108 |
| 555,395 | A |   | 2/1896 | Noice | |
| 2,002,677 | A | * | 5/1935 | Robinson | 222/108 |
| 2,812,116 | A | * | 11/1957 | Newman | 222/472 |
| 3,279,638 | A | * | 10/1966 | Merry | 215/395 |
| 3,768,681 | A | * | 10/1973 | Dougherty, Sr. | 215/221 |
| 4,676,411 | A | * | 6/1987 | Simasaki | 222/472 |
| 4,714,180 | A |   | 12/1987 | Stone, Jr. | |
| 5,653,362 | A | * | 8/1997 | Patel | 222/472 |
| 5,975,333 | A | * | 11/1999 | Lee | 220/571 |
| 6,216,754 | B1 | * | 4/2001 | Geroult et al. | 222/472 |
| 6,273,306 | B1 | * | 8/2001 | Takagawa | 222/509 |
| 6,427,880 | B1 | * | 8/2002 | Hirose et al. | 222/517 |
| 6,805,266 | B2 | * | 10/2004 | Doron et al. | 222/472 |

FOREIGN PATENT DOCUMENTS

| DE | 43 36 650 A1 | 5/1995 |
|---|---|---|
| EP | 1 077 181 | 8/2000 |
| GB | 669658 | 7/1949 |

* cited by examiner

Primary Examiner—Lien T Ngo
(74) Attorney, Agent, or Firm—Ursula B. Day; Henry M. Feiereisen

(57) ABSTRACT

Container, in particular, an insulated container with an outlet (8) that can be closed by a cover (9) and having a pouring spout and a drip-catch device which is arranged beneath a pouring spout, wherein the pouring spout (19) is removably disposed above the drip-catch device (26) in outlet (8) (FIG. 1).

14 Claims, 3 Drawing Sheets

CONTAINER

BACKGROUND OF THE INVENTION

The present invention relates to a container, and more particularly to an insulated container with an outlet which can be closed by means of a cover and which includes a pouring spout and a drip-catching device located beneath the pouring spout.

One of the biggest problems with containers, beverage cans and especially with coffee containers or cans is the after-dripping from the pouring spout at the can after pouring the coffee. This drip action not only leaves ugly stains running at the outside of the container but also stains the table wear on which the container is placed after the pouring action. In the past, this dripping problem has been addressed, however, so far without finding a practicable and satisfactory solution which would also be aesthetically appealing. The simplest and therefore the most common practice still is to provide an absorbing element beneath the pouring spout of the container or can. This solution is however very unsatisfactory both from the viewpoint of aesthetics as well as hygiene.

Furthermore, in another solution to address this problem, it is known to coat the surface area of the pouring spout with a polymer material, for example with silicon. While this solution has the desired effect of avoiding the after-dripping for a certain time when the can or container is new, it has been shown that after a certain period of time of use, especially in the case of coffee, residues are formed at the spout which gradually build up and increasingly worsen thereby resulting in an increase of after-dripping.

Furthermore, DE-OS 43 36 650 A1 discloses an insert for a pouring spout having capillary action. However, in this case likewise, after a period of time of use, the formation of residues negatively impacts the capillary action and after-dripping resumes.

Also known in the prior art is a can which is provided with a run-back channel beneath the pouring spout leading to a reservoir for catching the after-dripping. This particular embodiment is not only technically complicated and thus expensive to realize, but has the added disadvantage that cleaning the channel is difficult.

SUMMARY OF THE INVENTION

It is therefore an object of the invention to provide a container having a pouring spout with a device to catch the after-dripping that is cost-effective to produce, which lasts a long time and, in particular, which is easy to clean so as to avoid any hygiene problems. In addition, it is also desirable that the improved can or container has an aesthetically pleasing design.

This object is realized by the features wherein a can for pouring liquids therefrom comprises an upstanding housing having side walls and a bottom wall, wherein an upper portion of the housing defines an outlet, a drip-catch device formed in the housing, a removable pouring spout disposed in the outlet and above the drip-catch device. Since the entire pouring spout is removable, it is easy to clean and upon removal of the pouring spout, the area of the drip-catch device in the outlet is exposed for cleaning. This area can then also be easily cleaned. Since the pouring spout is configured as a separate part, no additional means for attachment or removal at the housing of the container are required. Due to this configuration, there are wide design possibilities.

Further design features include a cover for covering the outlet, wherein the pouring spout is provided with a disk shaped neck for insertion of the pouring snout between the cover and the outlet and a gasket disposed at the cover for searingly closing the outlet. The drip-catch is configured as a retaining chamber formed by an upper housing wall portion and an overhang formed at the housing wall portion and extending in direction of the pouring spout thereby defining a passage slot between the overhang and the pouring spout. The can further comprises a vertical ring which bears against an inner surface of the housing wall, and is connected to the disk-shaped neck and wherein the vertical ring transitions into the pouring spout. The cover is in cooperating relationship with a holding ring formed between the outlet and an inner surface of the housing wall, wherein the cover and the holding ring are connected by a bayonet lock. The bayonet lock extends in circular direction whereby a force is imposed upon the disk-shaped neck. The can also comprises a vacuum flask received in the housing, wherein the vacuum a lass flask is pressed against the outlet via a pressure screw situated at the bottom side of the housing and wherein a gasket is inserted between the vacuum-glass flask and the outlet. Due to the disk-shaped neck at the pouring spout, the pouring spout can be inserted with ease between the cover of the container and its outlet and clamped in place, without the need for additional attachment elements. It presents itself to dispose the closure of the outlet in the cover itself so as not interact with the pouring spout. Thus, the pouring spout, respectively the disk-shaped neck is sealed off relative to the outlet via a gasket.

An advantageous feature of the present invention is that the drip-catch device is formed as a relatively large retaining chamber which is formed by a housing wall extending upwardly, an overhang which is formed as an extension from the housing wall and projecting in the direction of the spout neck, and the bottom side of the pouring spout. With this, a safe drip-catching action is realized even when pouring from the can is done in a careless and hasty manner, or the pouring action is ended with an abrupt motion.

The pouring spout with its disk-shaped neck extends into a vertical ring formation, which configuration permits the secure insertion or reinsertion of the pouring spout into the outlet, after the can has been washed. Ease of handling is further supported by a holding ring for holding the cover, which is formed at the housing of the can. This ring likewise extends in an upward direction so that the pouring spout and the ring formed at the pouring spout can be form-fittingly inserted between the holding ring and the interior of the housing wall. An extension of the bayonet lock of the cover impinges upon the disk-shaped neck of the pouring spout whereby a securely sealed connection is realized. In this manner, malfunction of the device is virtually entirely precluded.

BRIEF DESCRIPTION OF THE DRAWING

Following is one exemplified embodiment of the invention which is described in more detail with reference to the drawings.

The invention is described here in connection with an insulated can with a vacuum-glass insert. However the invention is also applicable to a simpler type of container or can.

DETAILED DESCRIPTION OF PREFERRED EMBODIMENTS

Figure 1:
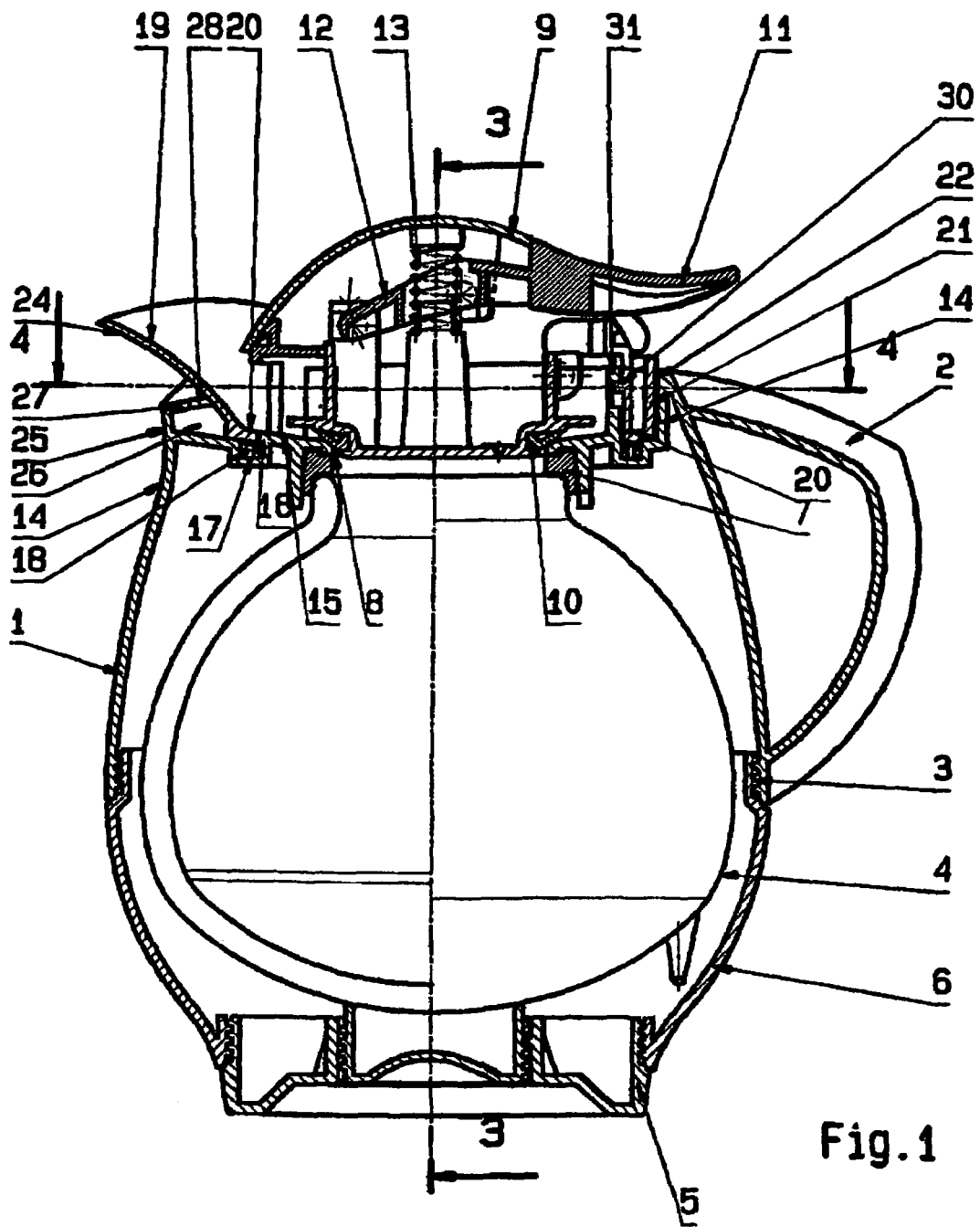
FIG. 1 is a longitudinal section of an insulated can with a vacuum glass flask according to the present invention.
Figure 2:
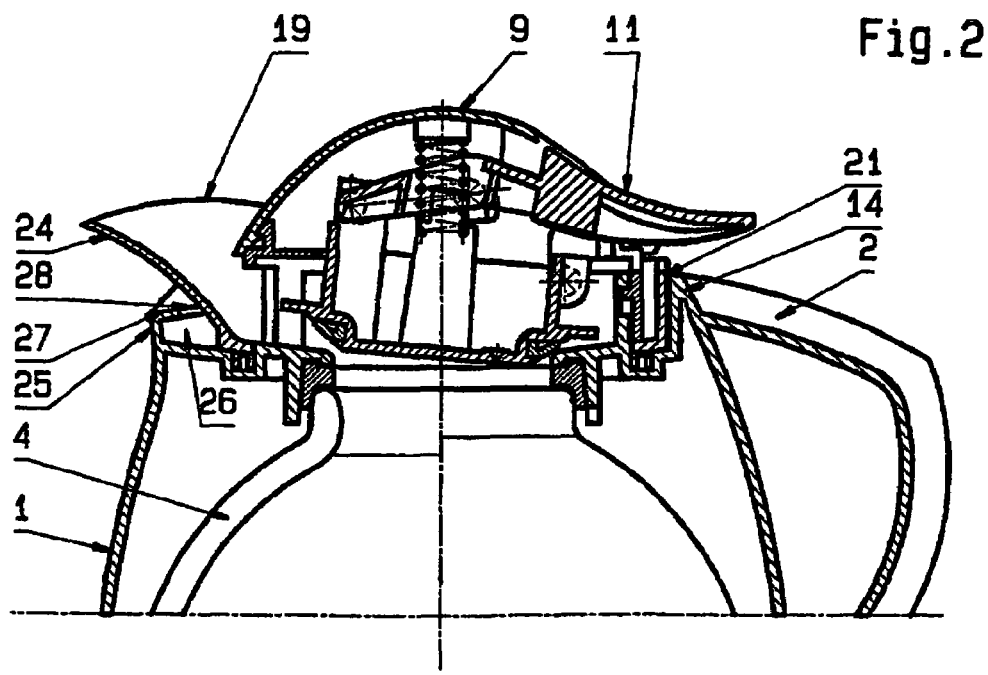
FIG. 2 is a partial view of the can of FIG. 1 with open cover.
Figure 4:
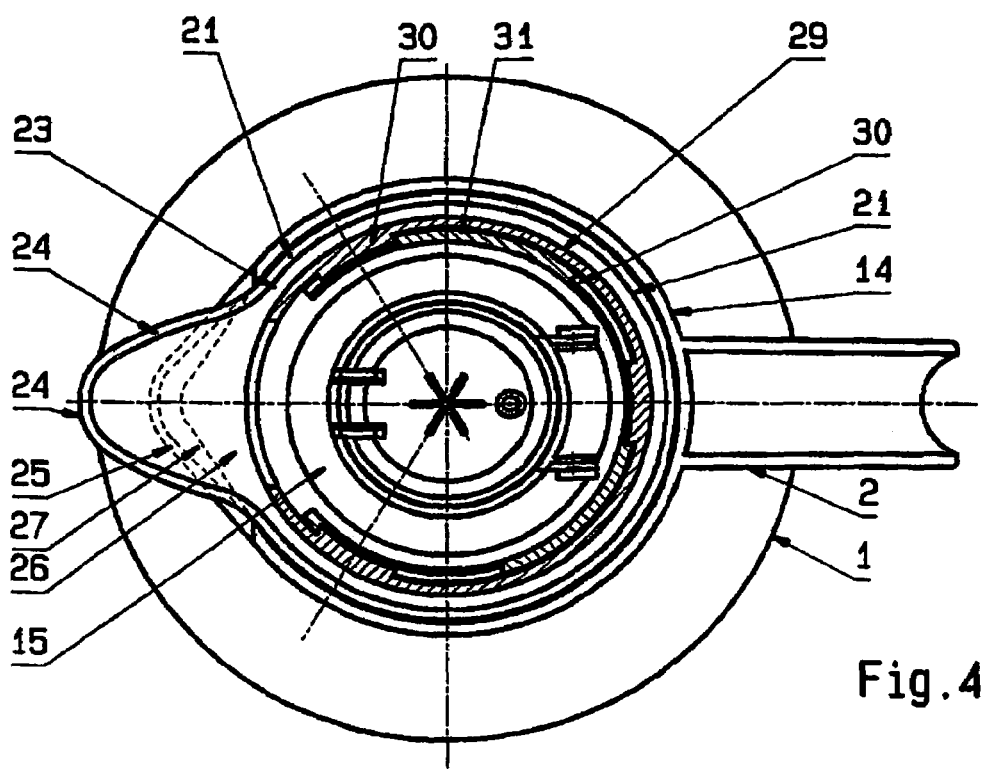
FIG. 4 is a section along line IV—IV according to FIG. 1.
Figure 3:
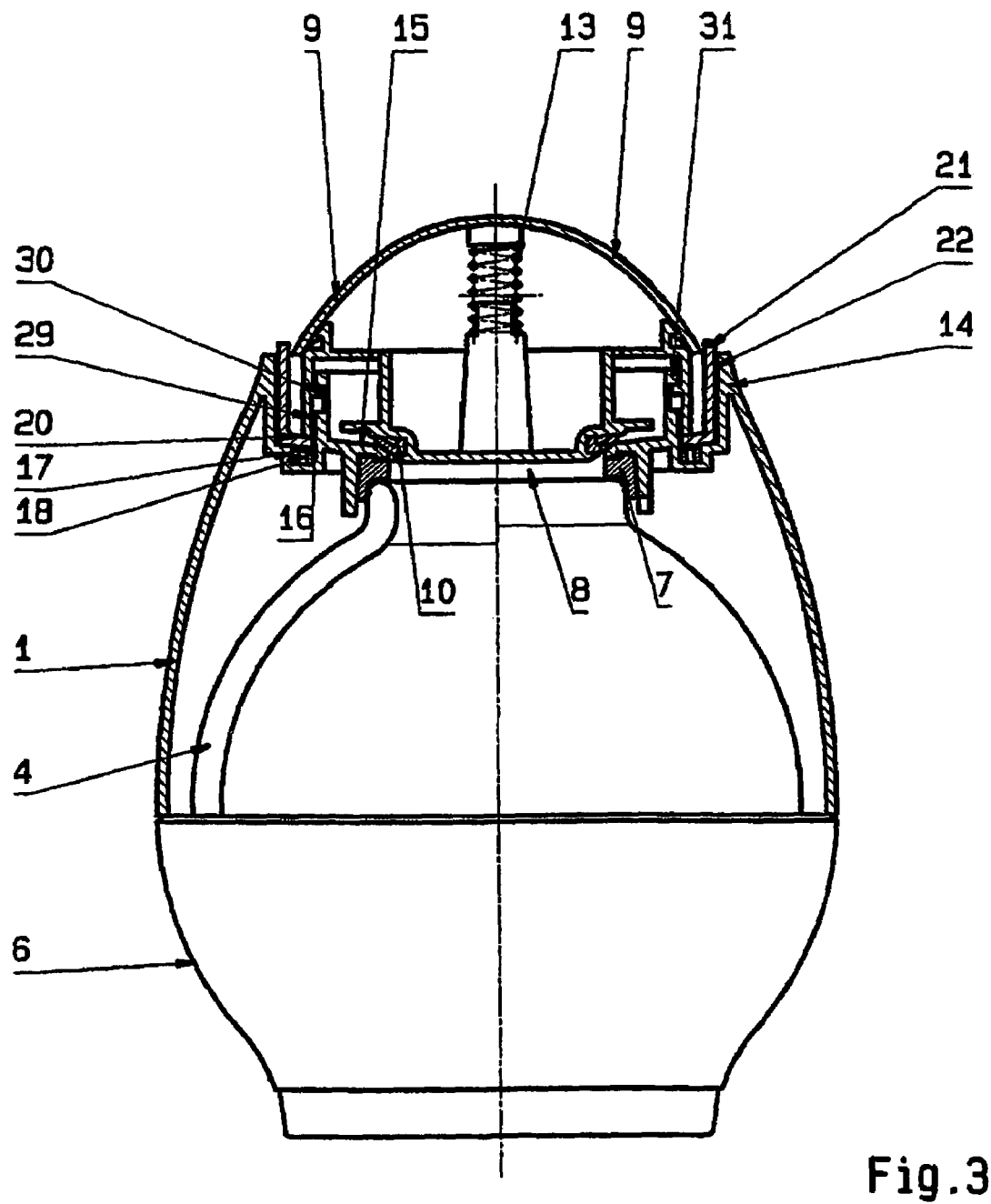
FIG. 3 is partial longitudinal section along line III—III according to FIG. 1.

A housing 1 with a handle 2 is shown divided into two parts by a threaded portion 3 for receiving a vacuum-glass flask 4. The vacuum glass flask 4 is pressed against the outlet 8 via a pressure screw 5 situated at the bottom side 6 of the housing 1 with a gasket 7 inserted between the vacuum-glass flask 4 and the outlet 8. Outlet 8 is part of the housing 1 and can be closed by means of a cover 9 provided with a further gasket 10. Cover 9 can be lifted via a lever system 12 by means of a push button 11 against the force of a spring 13. FIG. 2 shows the cover in a lifted open position.

Outlet 8 as part of the housing 1 is connected to housing wall 14 in a slightly inclined manner. The ring-shaped surface 15 resulting therefrom is provided with a shoulder 16 which transitions into a ring-shaped groove 17 for receiving a gasket 18. Shoulder 16 also forms a stop for the disk-shaped neck 20 joined to pouring spout 19. This disk-shaped neck 20 transitions into a vertical ring 21 which bears against an inner surface 22 of the housing wall 14. This vertical ring 21 forms a pouring channel 23 and transitions into the pouring spout neck 24.

In the area of a spout neck 24, ring surface 15 is likewise slightly extended forward thus forming together with a housing wall 25 a retaining chamber 26. Retaining chamber 26 extends into and is bordered at its upper end by an overhang 27 acting as a border for a passage slot 28 between spout neck 24 and overhang 27, which is oriented in the direction of spout neck 24.

Pouring spout 19 is being pressed against the gasket 18 via the disk-shaped neck 20 by means of an extension 29 of the bayonet catch 30 of the cover 9. Bayonet catch 30 of the cover 9 is in cooperative engagement with a holding ring 31 which is formed at the ring surface 15.

The invention claimed is:

1. A can for pouring liquids therefrom comprising:
An upstanding housing having sidewalls and a bottom wall, wherein an upper portion of the housing defines an outlet,
a drip-catch formed as part of the housing,
a removable pouring spout comprising a substantially lateral pouring lip and a disk-shaped neck inserted in the outlet for pouring from the can and removed from the outlet for accessing the drip catch for cleaning, wherein the drip catch is configured as a retaining chamber bordered by an upper housing wall portion and an overhang formed at the housing side wall portion and extending in the direction of the pouring spout thereby defining a passage slot between the overhang and the pouring spout and further comprising a vacuum flask received in the housing, wherein the vacuum glass flask is pressed against the outlet via a pressure screw situated at the bottom wall of the housing and wherein a gasket is inserted between the vacuum glass flask and the outlet.

2. The can of claim 1, further comprising a cover for covering the outlet.

3. The can of claim 2, wherein a gasket is disposed at the cover for searingly closing the outlet.

4. The can of claim 1, further comprising a vertical ring which bears against an inner surface of the housing wall, and is connected to the disk-shaped neck.

5. The can of claim 4, wherein the cover is in cooperating relationship with a holding ring formed between the outlet and an inner surface of the housing wall.

6. The can of claim 5, wherein the cover and the holding ring are connected by a bayonet lock.

7. The can of claim 6 wherein the bayonet lock extends in circular direction whereby a force is imposed upon the disk-shaped neck.

8. A can for pouring liquids comprising:
an upstanding housing having a side wall and a bottom wall, wherein an upper portion of the housing defines an open outlet,
a pouring spout configured as a separate part for insertion into and removal from the outlet, said pouring spout being unitary with a disk-shaped neck transitioning into a pouring lip and resting at an edge of the open outlet; a drip-catch disposed beneath the pouring spout, said drip catch formed as a separate retaining chamber in the side wall of the housing and separate from an interior of the housing, wherein the retaining chamber is bordered by an upper housing wall portion and an overhang formed of the housing side wall portion and extending in direction of the poring spout thereby defining a passage slot between the overhang and the pouring spout, and further comprising a vacuum flask received in the housing, wherein the vacuum flask in pressed against the outlet via a pressure screw situated at the bottom of the housing.

9. The can of claim 8, further comprising a cover for covering the outlet.

10. The can of claim 9, wherein a gasket is disposed at the cover for sealingly closing the outlet.

11. The can of claim 8, further comprising a vertical ring which bears against an inner surface of the housing wall, and is connected to the disk- shaped neck.

12. The can of claim 9, wherein the cover is in cooperating relationship with a holding ring formed between the outlet and an inner surface of the housing wall.

13. The can of claim 12, wherein the cover and the holding ring are connected by a bayonet lock.

14. The can of claim 13, wherein the bayonet lock extends in circular direction whereby a force is imposed upon the disk-shaped neck.

* * * * *

UNITED STATES PATENT AND TRADEMARK OFFICE
CERTIFICATE OF CORRECTION

PATENT NO. : 7,552,846 B2  Page 1 of 1
APPLICATION NO. : 11/061847
DATED : June 30, 2009
INVENTOR(S) : Heinz Josef Ohm and Berno Wörsdörfer It is certified that error appears in the above-identified patent and that said Letters Patent is hereby corrected as shown below:

Column 4, claim 3, line 6: replace "searingly" with --sealingly--;

Column 4, claim 8, line 32: replace "poring" with --pouring--;

Column 4, claim 8, line 35: replace "in" with --is--.

Signed and Sealed this

Twenty-second Day of September, 2009

David J. Kappos
*Director of the United States Patent and Trademark Office*